(12) United States Patent
Heyden et al.

(10) Patent No.: US 9,440,599 B2
(45) Date of Patent: Sep. 13, 2016

(54) ARRANGEMENT FOR DISPLAYING INFORMATION IN A VEHICLE

(75) Inventors: Anna Heyden, Göteborg (SE); Ida Esberg, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 63 days.

(21) Appl. No.: 14/414,096

(22) PCT Filed: Jul. 12, 2012

(86) PCT No.: PCT/SE2012/000109
§ 371 (c)(1),
(2), (4) Date: Jun. 19, 2015

(87) PCT Pub. No.: WO2014/011090
PCT Pub. Date: Jan. 16, 2014

(65) Prior Publication Data
US 2015/0307040 A1    Oct. 29, 2015

(51) Int. Cl.
| | | |
|---|---|---|
| B60Q 1/00 | (2006.01) | |
| B60R 16/023 | (2006.01) | |
| B60K 35/00 | (2006.01) | |
| B60C 23/00 | (2006.01) | |
| B60Q 3/02 | (2006.01) | |

(52) U.S. Cl.
CPC ........... *B60R 16/0232* (2013.01); *B60C 23/00* (2013.01); *B60K 35/00* (2013.01); *B60Q 3/0203* (2013.01); *B60Q 3/0293* (2013.01); *B60K 2350/901* (2013.01); *B60K 2350/921* (2013.01)

(58) Field of Classification Search
CPC ............ B60R 16/0232; B60Q 3/0293; B60Q 3/0203; B60C 23/00
USPC ............. 340/449, 425.5, 438, 539.28, 691.1, 340/691.6, 7.48, 815.4; 362/459, 543, 382, 362/84
See application file for complete search history.

(56) References Cited

U.S. PATENT DOCUMENTS

| | | | | |
|---|---|---|---|---|
| 6,481,877 B1 * | 11/2002 | Bello, Jr. | ............... | B60N 3/042 362/153 |
| 6,718,576 B1 * | 4/2004 | Shih | ....................... | B60N 3/042 362/488 |

(Continued)

FOREIGN PATENT DOCUMENTS

| | | |
|---|---|---|
| CN | 101528997 A | 9/2009 |
| CN | 101700708 A | 5/2010 |

(Continued)

OTHER PUBLICATIONS

International Search Report (May 15, 2013) for corresponding International App. PCT/SE2012/000109.

(Continued)

*Primary Examiner* — Toan N Pham
(74) *Attorney, Agent, or Firm* — WRB-IP LLP

(57) ABSTRACT

An arrangement is provided for displaying information to a driver in a vehicle, where the information includes an image, and where information is displayed by a textile material positioned on the floor of the vehicle and the information displayed is a condition outside of the vehicle, where the information is displayed in the direction in which the condition occurs outside of the vehicle. Information can be displayed to a driver of a vehicle by an information arrangement not used for other information.

9 Claims, 2 Drawing Sheets

(56) References Cited

U.S. PATENT DOCUMENTS

| | | | | |
|---|---|---|---|---|
| 7,670,022 B2* | 3/2010 | Kessler | ............... | A47L 23/266 |
| | | | | 362/153 |
| 9,347,634 B2* | 5/2016 | Salter | ................... | F21S 48/00 |
| 2002/0011925 A1 | 1/2002 | Hahn | | |
| 2007/0106471 A1 | 5/2007 | Yoshiguchi et al. | | |
| 2009/0129104 A1 | 5/2009 | Shimano et al. | | |
| 2010/0265731 A1 | 10/2010 | Van Herpen et al. | | |

FOREIGN PATENT DOCUMENTS

| | | |
|---|---|---|
| DE | 10161262 A1 | 7/2003 |
| DE | 202007006413 U1 | 7/2007 |
| DE | 102006012606 A1 | 11/2007 |
| DE | 102009041306 A1 | 3/2011 |
| GB | 2420536 A | 5/2006 |
| GB | 2435684 A | 9/2007 |
| JP | 2003-011766 A | 1/2003 |
| JP | 2007-125969 A | 5/2007 |
| JP | 2008-230-512 A | 10/2008 |
| JP | 2011-513889 A | 9/2011 |
| WO | 2006057531 A1 | 6/2006 |
| WO | 2010086034 A1 | 8/2010 |

OTHER PUBLICATIONS

International Preliminary Report on Patentability (May 27, 2014) for corresponding International App. PCT/SE2012/000109.

Japanese Official Action (translation) (Feb. 15, 2016) for corresponding Japanese Application 2015-521579.

Chinese Official Action (translation) (Jun. 21, 2016) for corresponding Chinese App. 201280074652.9.

* cited by examiner

ARRANGEMENT FOR DISPLAYING INFORMATION IN A VEHICLE

BACKGROUND AND SUMMARY

The present invention relates to an arrangement for displaying information in a vehicle. The arrangement is suitable for displaying information regarding conditions outside of the vehicles to the driver of the vehicle.

Modern vehicles are often provided with several information and warnings systems adapted to inform the driver of incidents or events. The information systems are adapted to give both crucial and non-important information to the driver, and the warning systems are adapted to give an alert to the driver when a specific event is happening or is about to happen, in order to avoid accidents. Information systems include the instrument cluster, the radio display, the navigation system and other systems. Warning systems includes blind-spot detection, reverse warning, parking assistance, line detection and others. The information systems and the warning systems may use the same or different display units, such as viewing screens and/or warning lamps.

One problem with the different information and alerts given by the different systems are that they are not always prioritised with regards to the importance of the information and alert. It may thus be difficult for the driver to notice or asses all information and alerts given. This is especially so for alerts given by a display means normally used for normal information.

US 2010265731 relates to a tufted textile comprising a light source arranged so as to radiate light from the light source at least partly through the tufted textile, which may be a carpet.

WO2006/05753 discloses a light-emitting mat for vehicles. The light-emitting mat comprises a transparent decoration plate having decorative patterns which correspond to a shape of an opening in the carpet such that the pattern can be lighted by a light source installed under the transparent plate.

DE 102006012606 discloses an interior lining for a vehicle that is light emissive. The lining is formed as a woven textile sheet, which is placed in front of a planar light source provided on a moulded component.

These textiles may be used for illuminating purposes.

There is thus a need for an improved information display arrangement for a vehicle.

It is desirable to provide an improved information display arrangement for a vehicle, where the information is displayed in the direction in which a condition occurs outside of the vehicle.

In an arrangement for displaying information to a driver in a vehicle, where the information comprises an image, the problem is solved in that the information is displayed by a textile material positioned on the floor of the vehicle and that the information displayed is a condition outside of the vehicle, where the information is displayed in the direction in which the condition occurs outside of the vehicle.

By this first embodiment of the information display arrangement, the arrangement displays information to the driver indicative of a condition outside of the vehicle, and the information is displayed in the direction in which the condition occurs. In this way, the information does not use the normal information means of the vehicle, which are often used for other information as well. The driver will thus be able to notice the displayed information in a more intuitive way. Further, since an area which is not used for information display is used, the information will not be mixed up with other information.

In an example of the inventive arrangement, the textile material is positioned on the floor of the vehicle. The textile material may be positioned on the floor at the driver or may be positioned in the complete front part of the driver compartment, both at the driver side and at the passenger side.

The information displayed is preferably different conditions which occur underneath the vehicle, i.e. which regards the road on which the vehicle travels. One such condition is e.g. the temperature of the road. If the temperature is close to freezing, a low temperature warning is usually given in the instrument cluster. With the inventive arrangement, a low temperature warning can also be given by the textile on the floor. Such a warning may e.g. be given by lighting the textile with a colour indicative of low temperature, e.g. by using an ice blue colour. It would also be possible to display snowflakes with the textile, which would give the driver a low temperature warning.

Other information which may be useful to display on the floor is a warning regarding the road marking lines. When a road marking line is being passed by the vehicle, e.g. at a lane change, it would be possible to display a line on the floor, indicative of where the road marking line is below the vehicle. In this way, the driver will receive information on where the vehicle is on the road. If the lane change is unintentional, it is preferred to flash the line displayed on the floor.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the claims. The arrangement is suitable for all kinds of vehicles, but a truck is used to exemplify the arrangement.

Figure 1:
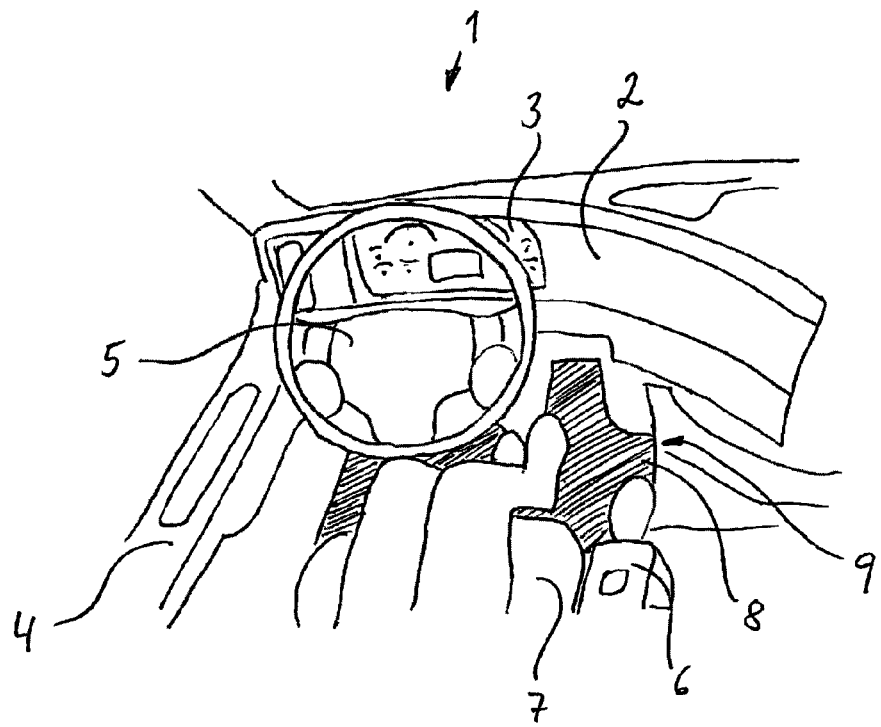
FIG. 1 shows a schematic view of a driver compartment of a truck having a first example of an inventive arrangement.

FIG. 1 shows a schematic view of a driver compartment of a truck with a first example of the inventive arrangement. The driver compartment 1 comprises an instrument panel 2 with an instrument cluster 3, a door panel 4, a steering wheel 5, a gear shift lever 6, a seat 7 and a floor mat 8. Further, the legs of the driver are shown. The floor mat 8 comprises a textile which is capable of displaying an information image, a so called smart textile. The information 9, 10, 11 is thus displayed on the floor of the vehicle.

There are different types of smart textiles known. One type is based on Electroluminescence materials (EL), which converts electrical energy into light without the generation of heat. Electroluminescence is an optical and electrical phenomenon in which a material emits light in response to the passage of an electric current to a strong electric field.

The excited electrons release their energy as photons, i.e. as light. An EL-wire is a light emitting capacitor. The capacitive structure is developed with the light emitting electroluminescent semiconductor layers sandwiched between two conductive electrodes. An EL-panel is basically the same material as EL-wire but in the shape of a flat sheet. An electroluminescent panel is paper thin, flexible and lightweight and is available in a wide range of colors, it can dim or flicker. Some EL-wires can change from one color to another (e.g. green to blue) depending on the current given. The wire is also UV-resistant. The wire emits no heat.

Another type is known as photonic textiles, which are fabrics that contain lighting systems and can therefore serve as displays. This is done by integrating flexible arrays of multicoloured light-emitting diodes (e.g. OLEDs) into fabrics and doing so without compromising the softness of the cloth.

Current photonic textiles are either based on integrating standard components such as LEDs with conductive yarns inside the textile or developing optoelectronic devices with a fibre form factor, such as photo luminescent polymer-coated fibres, surface- or side-emitting fibres, or yarns coated with thermo-chromic ink, that can be integrated directly into textile structures.

The advantage of OLEDs, in comparison to the LEDs that are often used in textiles, is the emission of homogenous light over a larger surface area. In addition, feedback from designers shows that photonic systems enabled by OLEDs are aesthetically more pleasing than LED-based enhanced textiles that must be covered by additional textile optical diffuser layers. Compared to other fibre-based photonic systems such as textiles fabricated from photo luminescent, thermo-chromic, or optical fibres, OLEDs have higher light intensities. And finally, OLEDs are also lightweight, have a flat form factor, and can be flexible if fabricated on a polymer foil substrate.

By using a smart textile on the floor of the vehicle, information can be displayed to the driver by the smart textile. In FIG. 1, the floor mat 8 comprises a smart textile adapted to display a specific colour when a specific event occurs. In this example, the information is displayed as a specific colour 9 on the complete floor mat surface.

One such event may be the temperature of the road. If the temperature is close to freezing, the low temperature condition can be shown by lighting the textile with a colour indicative of low temperature, e.g. by using an ice blue colour. It is further possible to vary the intensity of the colour in dependency of the actual ambient temperature or by the actual temperature of the road, such that the light is dim at a temperature of e.g. 6 degrees centigrade and that the light lights with full intensity at e.g. 2 degrees centigrade. Depending on the type of smart textile used, other colours such as white may also be used to indicate a low temperature.

Figure 2:
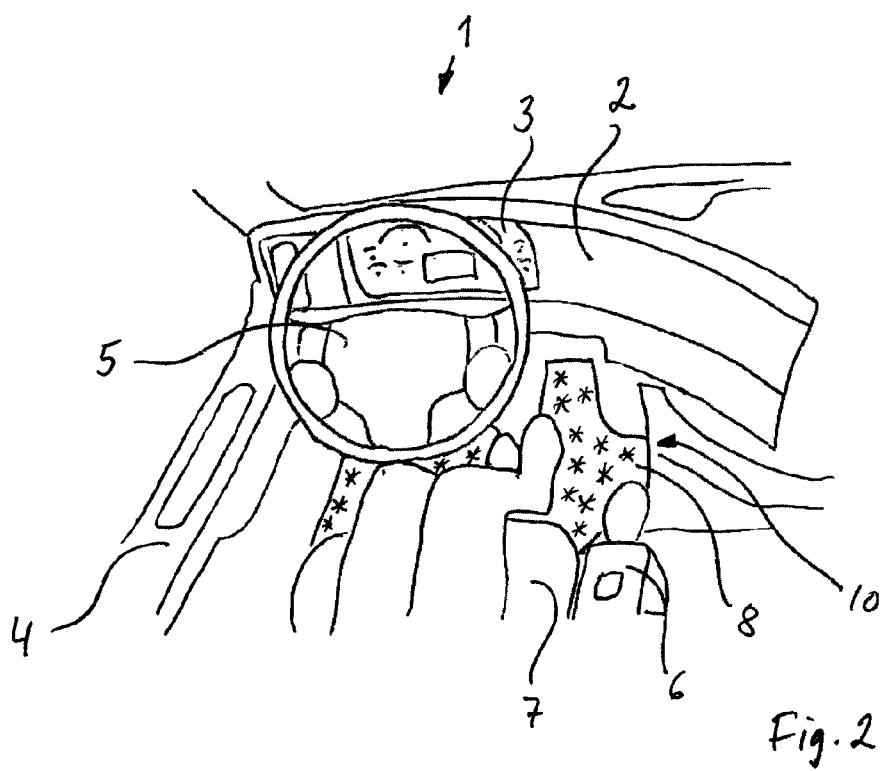
FIG. 2 shows a example schematic view of a driver compartment of a truck having a further example of an inventive arrangement.

In FIG. 2, another example of a low temperature warning is shown. Here, the information is displayed as snowflakes 10 on the floor by the smart textile, which will also give the driver a low temperature warning. The intensity of the snowflakes may vary with the actual ambient temperature, or the size of the snowflakes may vary with the actual temperature. It is also possible to let the colour of the snowflakes vary in dependency of the actual ambient temperature.

Figure 3:
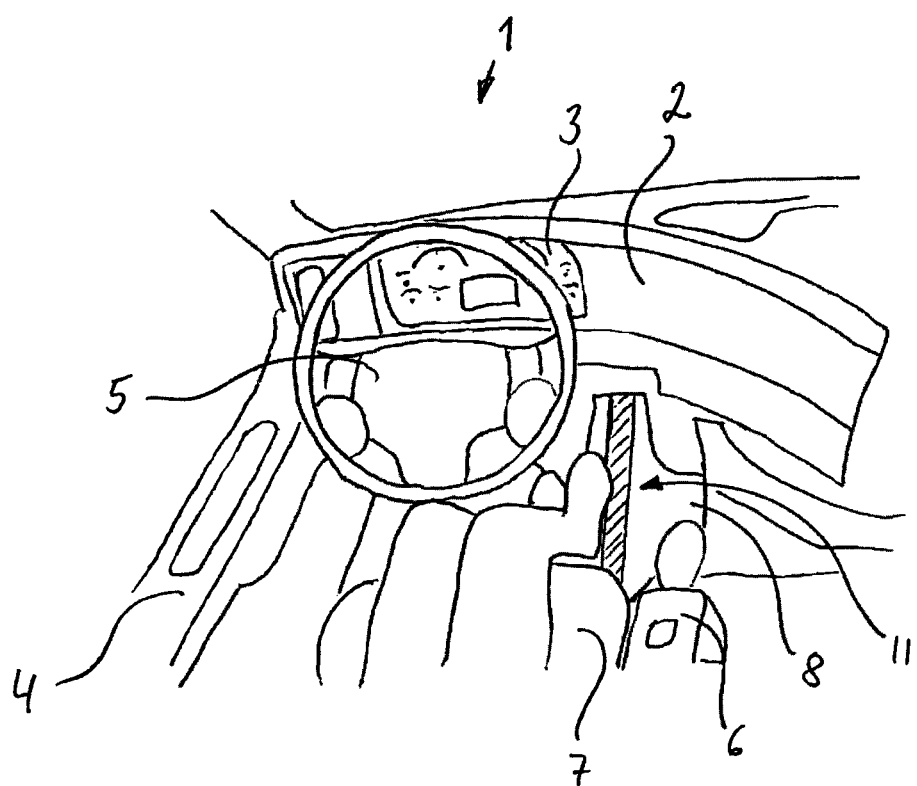
FIG. 3 shows a schematic view of a driver compartment of a truck having a further example of an inventive arrangement.

In FIG. 3, a further example of information which is display by the inventive arrangement is shown. In this example, information regarding the road marking lines is displayed. The information is preferably displayed as a line 11 on the floor, preferably corresponding to the position of the actual position of the road marking line on the road underneath the vehicle. In this way, the driver will receive information of the exact location of the road marking line when a road marking line is being passed by the vehicle, e.g. during a lane change. If the lane change is unintentional, e.g. if the driver passes the road marking line without using the flasher, it is possible to flash the line displayed on the floor, in order to give the driver a warning.

The invention is not to be regarded as being limited to the embodiments described above, a number of additional variants and modifications being possible within the scope of the subsequent claims.

The invention claimed is:

1. An arrangement for displaying information to a driver in a vehicle, where the information comprises an image, wherein the information is displayed by a textile material positioned on a floor of the vehicle and that the information displayed is a condition outside of the vehicle, where the information is displayed to the driver in a direction in which the condition occurs outside of the vehicle, where the information is emitted by the textile material.

2. Arrangement according to claim 1, wherein the information displayed is indicative of a temperature of the road.

3. Arrangement according to claim 1, wherein the information displayed is indicative of an ambient temperature of the vehicle.

4. Arrangement according to claim 1, wherein the information is displayed in dependency of an actual temperature.

5. Arrangement according to claim 1, wherein the information is displayed as a colour.

6. Arrangement according to claim 1, wherein the information is displayed as a pattern.

7. Arrangement according to claim 1, wherein the information displayed is indicative of a road marking line underneath the vehicle.

8. Arrangement according to claim 7, wherein the information is displayed as a line.

9. Vehicle comprising an arrangement according to claim 1.

* * * * *